US012757229B2

(12) United States Patent
Shao et al.

(10) Patent No.: US 12,757,229 B2
(45) Date of Patent: Oct. 6, 2026

(54) METHODS AND APPARATUS OF MULTICAST BROADCAST SERVICES TRANSMISSION AND RECEPTION ON SCELL OR NON-SERVING CELL

(71) Applicant: MediaTek Singapore Pte. Ltd., Singapore (SG)

(72) Inventors: Xuanbo Shao, Beijing (CN); Xuelong Wang, Beijing (CN)

(73) Assignee: MEDIATEK Singapore Pte. Ltd, Singapore (SG)

( * ) Notice: Subject to any disclaimer, the term of this patent is extended or adjusted under 35 U.S.C. 154(b) by 424 days.

(21) Appl. No.: 18/339,828

(22) Filed: Jun. 22, 2023

(65) Prior Publication Data

US 2024/0008059 A1 Jan. 4, 2024

Related U.S. Application Data

(63) Continuation-in-part of application No. PCT/CN2022/102433, filed on Jun. 29, 2022.

(30) Foreign Application Priority Data

Jun. 29, 2022 (WO) ................ PCT/CN2022/102433
May 26, 2023 (CN) ......................... 202310610298.7

(51) Int. Cl.
*H04W 72/30* (2023.01)
*H04W 72/0453* (2023.01)
*H04B 7/0413* (2017.01)

(52) U.S. Cl.
CPC ....... *H04W 72/30* (2023.01); *H04W 72/0453* (2013.01); *H04B 7/0413* (2013.01)

(58) Field of Classification Search
CPC ... H04W 72/30; H04W 72/0453; H04W 4/06; H04B 7/0413; H04L 5/001
See application file for complete search history.

(56) References Cited

U.S. PATENT DOCUMENTS

2023/0049868 A1* 2/2023 Zhou ..................... H04L 5/0098
2023/0209315 A1* 6/2023 Shrivastava ............ H04W 4/06
370/329

(Continued)

*Primary Examiner* — Yu-Wen Chang
(74) *Attorney, Agent, or Firm* — Helen Mao; Imperium Patent Works

(57) ABSTRACT

Apparatus and methods are provided for multicast broadcast service (MBS) transmission and reception on secondary cell (SCell) or non-serving cell. In one novel aspect, the UE receiving unicast from a serving PCell, reports assistance information for receiving MBS to the PCell and receives MBS from the non-serving cell or the SCell simultaneously with the reception of the unicast. In one embodiment, the assistance information includes one or more elements comprising supported band combination, common frequency resource (CFR) configuration, the number of component carrier, MIMO layer, modulation order and subcarrier spacing. In one embodiment, the UE receives adjustment configuration for the unicast in preparation for the MBS reception. In one embodiment, one or more CCs for the unicast is deactivated/released for the MBS reception. In one embodiment, the two-step procedure, which is the broadcast control channel (BCCH) and MBS control channel (MCCH), is used for the MBS reception.

20 Claims, 8 Drawing Sheets

(56) References Cited

U.S. PATENT DOCUMENTS

| | | | | |
|---|---|---|---|---|
| 2023/0239660 | A1* | 7/2023 | Kim | H04W 76/10<br>370/312 |
| 2023/0276468 | A1* | 8/2023 | Wu | H04W 72/30<br>370/312 |
| 2023/0328743 | A1* | 10/2023 | Takeda | H04W 4/06<br>370/329 |
| 2023/0328763 | A1* | 10/2023 | Babaei | H04W 48/20 |
| 2024/0089704 | A1* | 3/2024 | Shrivastava | H04W 72/0453 |
| 2024/0237143 | A1* | 7/2024 | Fujishiro | H04W 72/1273 |
| 2025/0016660 | A1* | 1/2025 | Chen | H04W 8/22 |
| 2025/0031276 | A1* | 1/2025 | Zhang | H04W 4/06 |
| 2025/0280468 | A1* | 9/2025 | Xu | H04W 4/06 |

* cited by examiner

METHODS AND APPARATUS OF MULTICAST BROADCAST SERVICES TRANSMISSION AND RECEPTION ON SCELL OR NON-SERVING CELL

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/102433, titled "Methods and apparatus of Multicast Broadcast services transmission and reception on SCell or Non-serving Cell," filed on Jun. 29, 2022. This application claims priority under 35 U.S.C. § 119 from Chinese Application Number 202310610298.7, titled "Methods and apparatus of Multicast Broadcast services transmission and reception on SCell or Non-serving Cell," filed on May 26, 2023. The disclosure of each of the foregoing documents is incorporated herein by reference.

TECHNICAL FIELD

The disclosed embodiments relate generally to wireless communication, and, more particularly, to multicast broadcast services transmission and reception on secondary cell (SCell) or non-serving cell.

BACKGROUND

With the rapid development of mobile communication system, the demand of multicast broadcast service (MBS) is emerging, e.g., popular media content, live stream, video distribution, vehicle-to-everything (V2X) communication, public safety (PS) communication and so on. In these cases, gNB can send a multicast or broadcast services to very larger number of UE consuming the same data, which can decrease the physical downlink control channel signalling overhead and spectrum resource to some extent. MBS based on new radio (NR) was introduced too. The current design for multicast broadcast service only considers that the UE is in the serving cell to receive the multicast broadcast service. For example, the UE needs to subscribe the operator's service before receiving the corresponding multicast broadcast service. In other words, if the UE does not subscribe the operator's service offering the multicast broadcast service, it cannot receive MBS from non-serving cell, which undoubtedly restricts the maximum number of users of the service. Further, in some typical use cases of multicast broadcast service, e.g., emergency and public safety service, the UE may be required to simultaneously receive multicast broadcast service and unicast service from the network(s) of same or different operators, which requires the UE to receive MBS from non-serving cells.

Improvements and enhancements are required to enable the UE to receive MBS from non-serving cells.

SUMMARY

Apparatus and methods are provided for multicast broadcast service (MBS) transmission and reception on secondary cell (SCell) or non-serving cell. In one novel aspect, the UE receiving unicast from a serving PCell, reports assistance information related MBS receiving to the PCell and receives MBS from the non-serving cell or the SCell simultaneously with the reception of the unicast. In one embodiment, the assistance information includes one or more elements comprising supported band combination, common frequency resource (CFR) configuration, the number of component carrier, multiple input multiple output (MIMO) layer, modulation order, and subcarrier spacing. In one embodiment, the UE further reports a UE capability to the serving PCell indicating whether the UE can receive MBS from the non-serving cell or the Scell. In one embodiment, the assistance information reporting is triggered by the current serving PCell or the UE. In one embodiment, the UE receives adjustment configuration from the current serving PCell for the unicast service in preparation for the MBS reception from the non-serving cell or the Scell. In one embodiment, one or more CCs for the unicast is deactivated/released for the MBS reception. In one embodiment, two-step procedure, which is the broadcast control channel (BCCH) and MBS control channel (MCCH), is used for the MBS reception. In one embodiment, the UE receives MCCH and MTCH in the non-serving cell or the SCell, and receives BCCH with a system information or a dedicated signaling in the non-serving cell or the SCell, wherein the system information is scrambled with a system information RNTI (SI-RNTI), and the dedicated signaling is scrambled with a cell radio network temporary identifier (C-RNTI). In another embodiment, the UE receives MCCH and MTCH in the non-serving cell or the SCell, and BCCH with a system information or a dedicated signaling in the serving PCell, wherein the system information is scrambled with a system information RNTI (SI-RNTI), and the dedicated signaling is scrambled with a cell radio network temporary identifier (C-RNTI). In one embodiment, the UE receives MTCH in the non-serving cell or the SCell, and receives MCCH in the serving PCell, and receives broadcast specific BCCH in the serving PCell.

In another novel aspect, the base station of a serving PCell transmits a unicast service to a user equipment (UE) in a wireless network, wherein the UE is configured with multiple component carriers (CC), and wherein the unicast service is configured with one or more CCs of the UE, receives assistance information for multicast and broadcast service (MBS) from the UE for a MBS reception in a non-serving cell or a SCell, and sends reconfiguration message to the UE for the unicast service based on the assistance information such that the UE receives the unicast service in the serving PCell and the MBS in the non-serving cell or the SCell simultaneously. In one embodiment, reconfiguration message deactivates one or more CCs for the unicast service.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services. These services may have different quality of service (QoS) requirements e.g., latency, connected density and reliability requirements.

Figure 1:
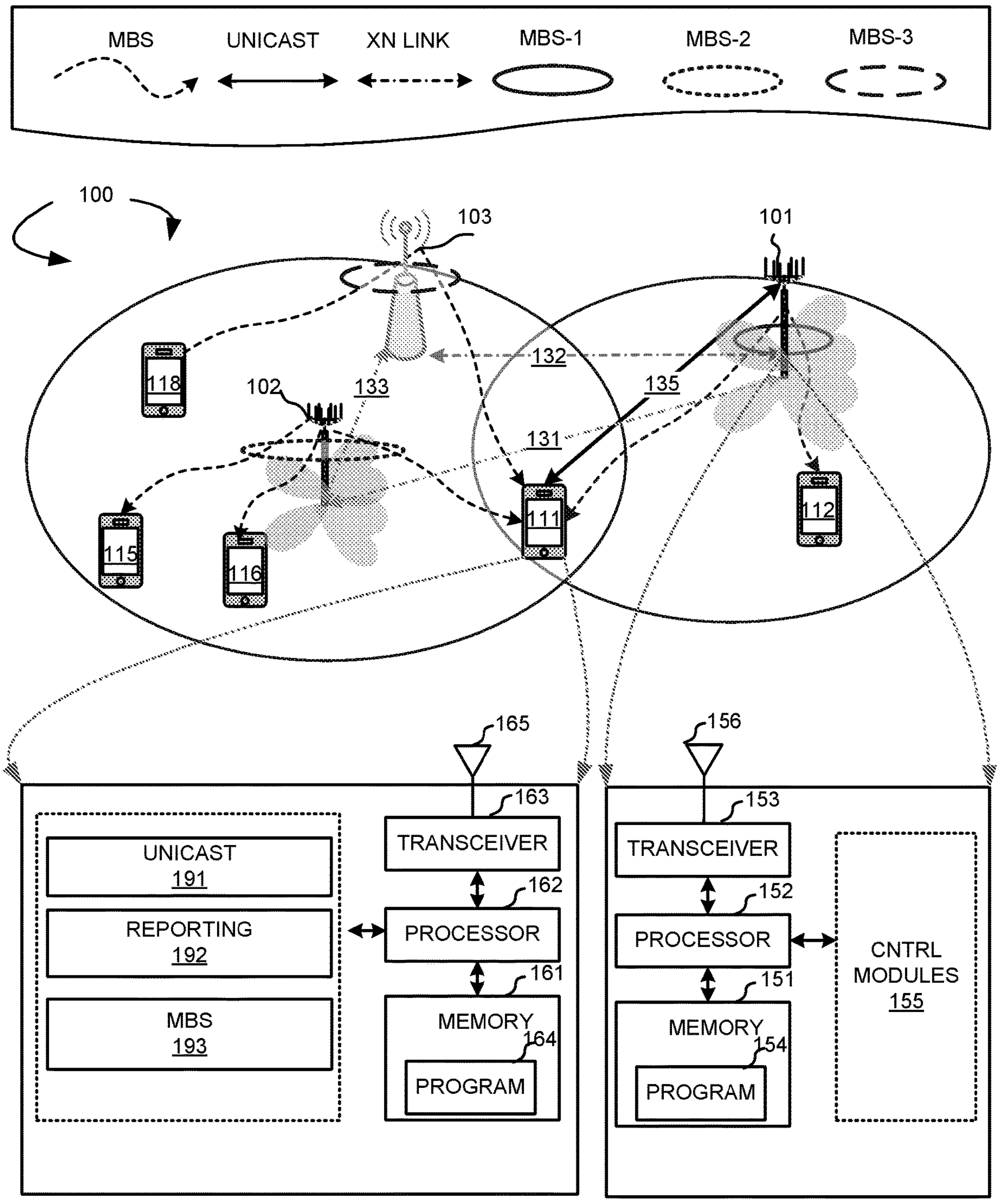
FIG. 1 is a schematic system diagram illustrating an exemplary wireless network that supports the UE to receive MBS from non-serving cells or SCell in accordance with embodiments of the current invention.

FIG. 1 is a schematic system diagram illustrating an exemplary wireless network that supports the UE to receive MBS from non-serving cells or SCell in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or other terminology used in the art. The network can be a homogeneous network or a heterogeneous network, which can be deployed with the same frequency or different frequencies. gNB 101 and gNB 102 are base stations in the network with a first operator, the serving area of which may or may not overlap with each other. gNB 103, which belongs to a different operator, serves overlapping areas with gNB 101 and/or gNB 102. The connections via Xn interface, such as 131, 132, and 133, connect the non-co-located receiving base units, such as gNB 101, gNB 102, and gNB 103.

Wireless network 100 also includes multiple communication devices or mobile stations, such as user equipments (UEs) 111, 112, 115, 116, and 118. The UE may also be referred to as mobile station, a mobile terminal, a mobile phone, a smart phone, a wearable device, an IoT device, a table let, a laptop, or other terminology used in the art. The UEs, such as UE 111, are configured with multiple component carriers (CCs), which include primary CC (PCC) and secondary CC (SCC). UE 111 is also configured with connections to a primary cell (PCell) and one or more secondary cell (SCell). The SCell may be served by the same base station, such as gNB 101, or served by different base stations, such as gNB 102. Wireless network 100 has one or more MBS, such as MBS-1 provided by gNB 101, MBS-2 provided by gNB 102, and MBS-3 provided by gNB 103. As an example, UE 111 and 112 receive MBS-1 from gNB 101. UE 115 and 116 both receive MBS-2 from gNB 102. UE 118 as a subscriber receives MBS-3 from gNB 103.

In one novel aspect, the UE receives the MBS in another cell from the different operator, e.g., non-serving cell, or the same operators, e.g., SCell, while receiving the unicast service in a different cell, e.g., the serving PCell. As an example, a mobile device, such as UE 111, can establish one or more unicast connections with one or more base stations. For example, UE 111 has a unicast connection 135 with gNB 101. gNB 101 is the serving PCell for UE 111. UE 111 can receive MBS-1 from gNB 101 through traditional subscription to MBS-1. In one embodiment, UE 111 is configured with multiple CC, with SCC configured for gNB 102. In one novel aspect, the UE, such as UE 111, receives MBS from non-serving cells, such MBS-3 from gNB 103, and/or from SCells, such as MBS-2 from gNB 102.

FIG. 1 further illustrates simplified block diagrams of a base station and a mobile device/UE for MBS transmission and reception on SCell or non-serving cell. gNB 101 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 101. gNB 101 also includes a set of control modules 155 that carry out functional tasks to communicate with mobile stations. Control modules 155 are configured to transmit a unicast service to a user equipment (UE) in a wireless network, wherein the UE is configured with multiple component carriers (CC), and wherein the unicast service is configured with one or more CCs of the UE. Control modules 155 are further configured to receive assistance information for multicast and broadcast service (MBS) from the UE for receiving an MBS in a non-serving cell or a secondary cell (SCell), and send a reconfiguration message to the UE for the unicast service based on the reported assistance information such that the UE receives the unicast service in the serving PCell and the MBS in the non-serving cell or the SCell simultaneously.

FIG. 1 also includes simplified block diagrams of a UE, such as UE 111. The UE has an antenna 165, which transmits and receives radio signals. An RF transceiver circuit 163, coupled with the antenna 165, receives RF signals from antenna 165, converts them to baseband signals, and sends them to processor 162. In one embodiment, the RF transceiver circuit 163 may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in UE 111. Memory 161 stores program instructions and data 164 to control the operations of UE 111. Antenna 165 sends uplink transmission and receives downlink transmissions to/from antenna 156 of gNB 102.

The UE also includes a set of control modules that carry out functional tasks. These control modules can be implemented by circuits, software, firmware, or a combination of them. A unicast module 191 receives a unicast service from a serving primary cell (PCell) in the wireless network, wherein the UE is configured with multiple component carriers (CC), and wherein the unicast service is configured with one or more CCs of the UE. A reporting module 192 reports assistance information for receiving multicast and broadcast service (MBS) to the PCell. An MBS module 193 receives an MBS from a non-serving cell or a secondary cell (SCell) simultaneous with reception of the unicast service from the serving PCell.

Figure 2A:
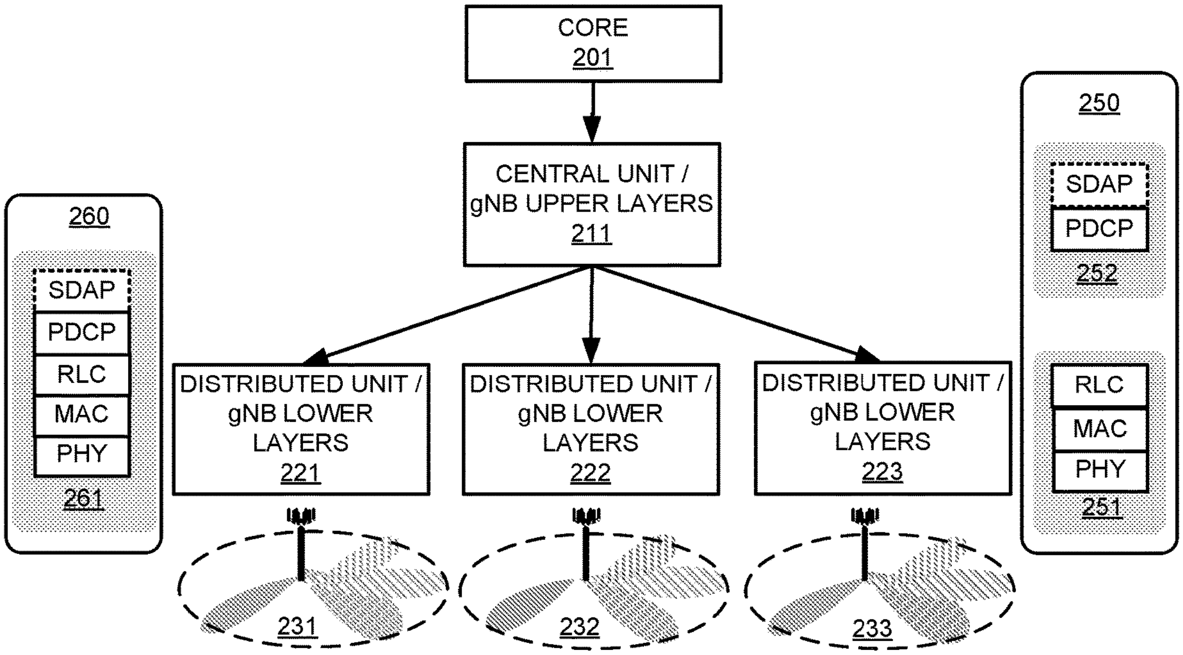
FIG. 2A illustrates an exemplary NR wireless system with centralized upper layers of the NR radio interface stacks and UE stack with multicast protocol and unicast protocol.

FIG. 2A illustrates an exemplary NR wireless system with centralized upper layers of the NR radio interface stacks and UE stack with multicast protocols and unicast protocols. Different protocol split options between central unit (CU) and distributed unit (DU) of gNB may be possible. The functional split between the CU and DU of gNB may depend on the transport layer. Low performance transport between the CU and DU of gNB can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 2B:
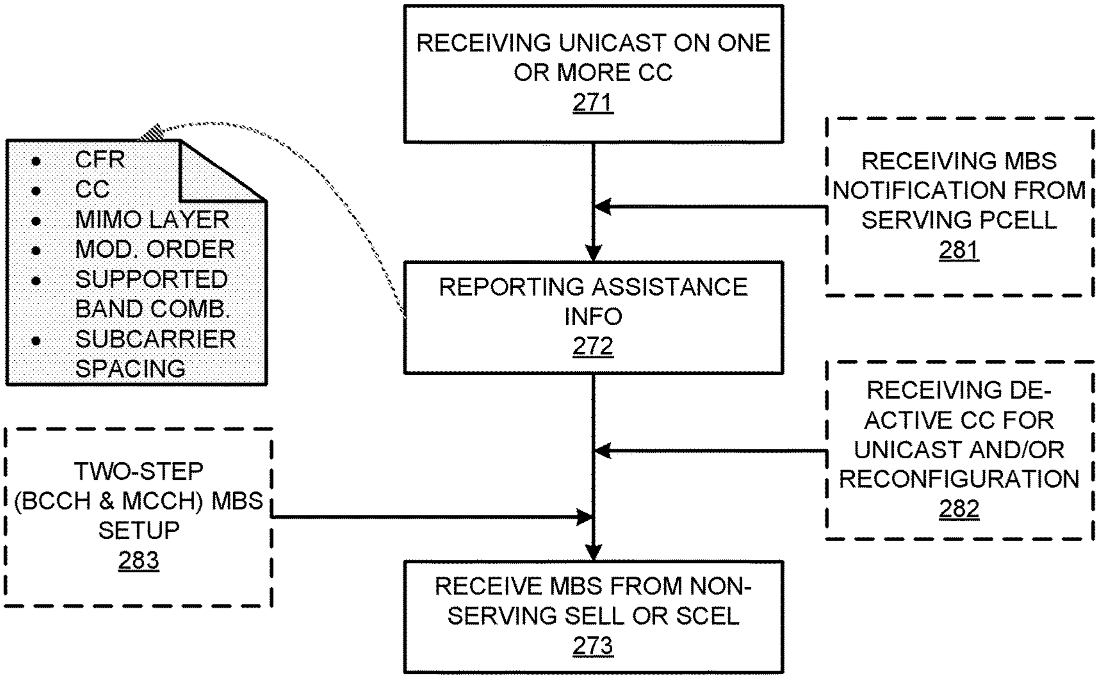
FIG. 2B illustrates exemplary top-level diagrams for the UE to receive MBS from non-serving cell or SCell in accordance with embodiments of the current invention.

FIG. 2B illustrates exemplary top-level diagrams for the UE to receive MBS from non-serving cell or SCell in accordance with embodiments of the current invention. At step 271, the UE receives a unicast service from the serving PCell. The UE is configured with one or more CCs. In one embodiment, before the UE receives the MBS from a non-serving cell or an SCell, at step 272, the UE reports the corresponding assistance information and the corresponding capability that it can receive the multicast broadcast to the serving cell. The corresponding assistance information includes one or more UE elements comprising supported band combination, common frequency resource (CFR) configuration, the number of component carrier, MIMO layer, modulation order, subcarrier spacing for the multicast broadcast reception on SCell or non-serving cell. In one embodiment, the assistance information is sent by the radio resource control (RRC) message. In one embodiment, the assistance information is included in MBS interest indicator (MII) signaling. In one embodiment (281), the assistance information transmission is triggered by receiving an MBS notification from the network. The MBS notification could be an MBS available indication from the serving PCell. In another embodiment, the UE initiated the assistance information transmission to indicate to the serving PCell its interest in the MBS provided by a non-serving cell or an SCell. At step 273, the UE receives MBS from the non-serving cell or the SCell.

In one embodiment (282), the UE receives a reconfiguration message from the serving PCell to reconfigure the unicast service such that the MBS can be received by the UE. In one embodiment, the network deactivates/releases one or more unicast CCs for the reception of the MBS. The network adjusts UE configurations for the unicast, such as adjusting the transport block (TB) size based on the remaining maximum data rate for the UE receiving the unicast. In one embodiment, the serving PCell sends an adjustment configuration for the unicast service to the UE. The adjustment configuration may deactivate one or more CCs for the unicast service.

In one embodiment (283), the two-step approach (i.e., broadcast control channel (BCCH) and MBS control channel (MCCH)) will be used for UE receiving the broadcast on other cell, e.g., SCell or non-serving cell. The UE can directly receive the MBS broadcast BCCH (e.g., SIB20) on SCell or non-serving cell, which carry the MCCH configuration/information for receiving the MCCH, e.g., the MCCH repetition or a modification periodicity and so on. SIB20 contains the information required to acquire the MCCH configuration for MBS broadcast. Based on the MCCH configuration, UE can read MCCH and obtain the confirmation information for MBS traffic channel (MTCH), e.g., group radio network temporary identifier (G-RNTI), discontinuous reception (DRX) configuration and so on.

Figure 3:
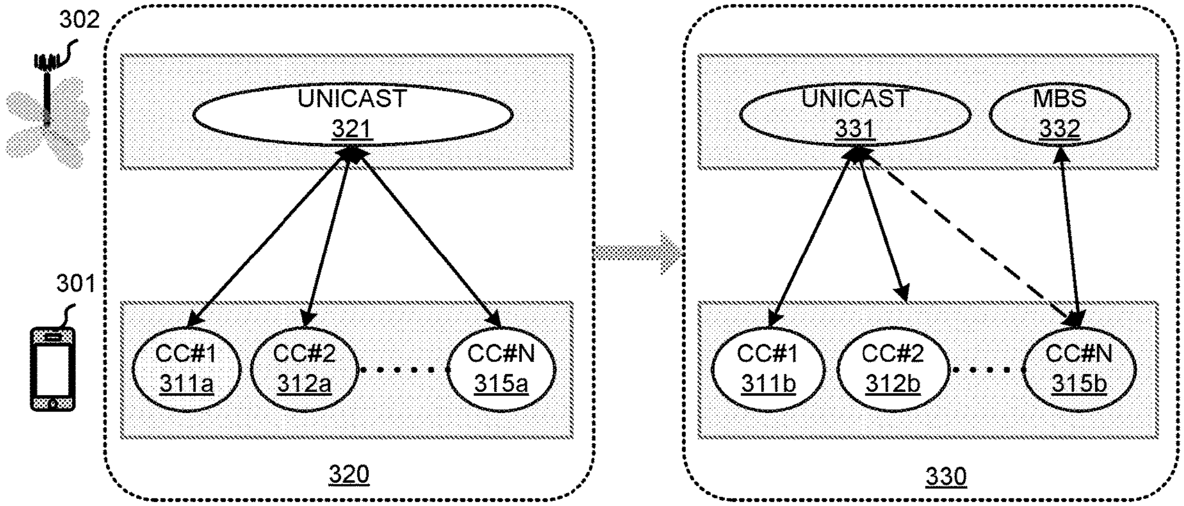
FIG. 3 illustrates exemplary diagrams of UE receiving unicast service with multiple CCs and using the shared CC to receive unicast service and MBS from non-serving cell or SCell in accordance with embodiments of the current invention.

FIG. 3 illustrates exemplary diagrams of UE receiving unicast with multiple CCs and using the shared CC to receive unicast service and MBS from non-serving cell or SCell in accordance with embodiments of the current invention. UE 301 receives unicast service from the serving PCell gNB 302. In the first scenario 320, UE 301 has multiple component carriers, such as CC #1 **311*a*, CC #2 312*a*, and CC #N 315*a* to receive the unicast service 321 on current serving cell. In the second scenario 330, when there is multicast broadcast service on SCell or non-serving cell, the UE can use the shared processing capability to simultaneously receive the unicast service 331 from serving cell and multicast broadcast service 332 on SCell or non-serving cell. UE 301 receives the unicast service from serving cell with CC #1 311*b*, CC #2 312*b* and part of capability CC #N 315*b* if needed. UE 101 receives MBS from SCell or non-serving cell on CC #N 315*b*** and simultaneously receives unicast.

Figure 4:
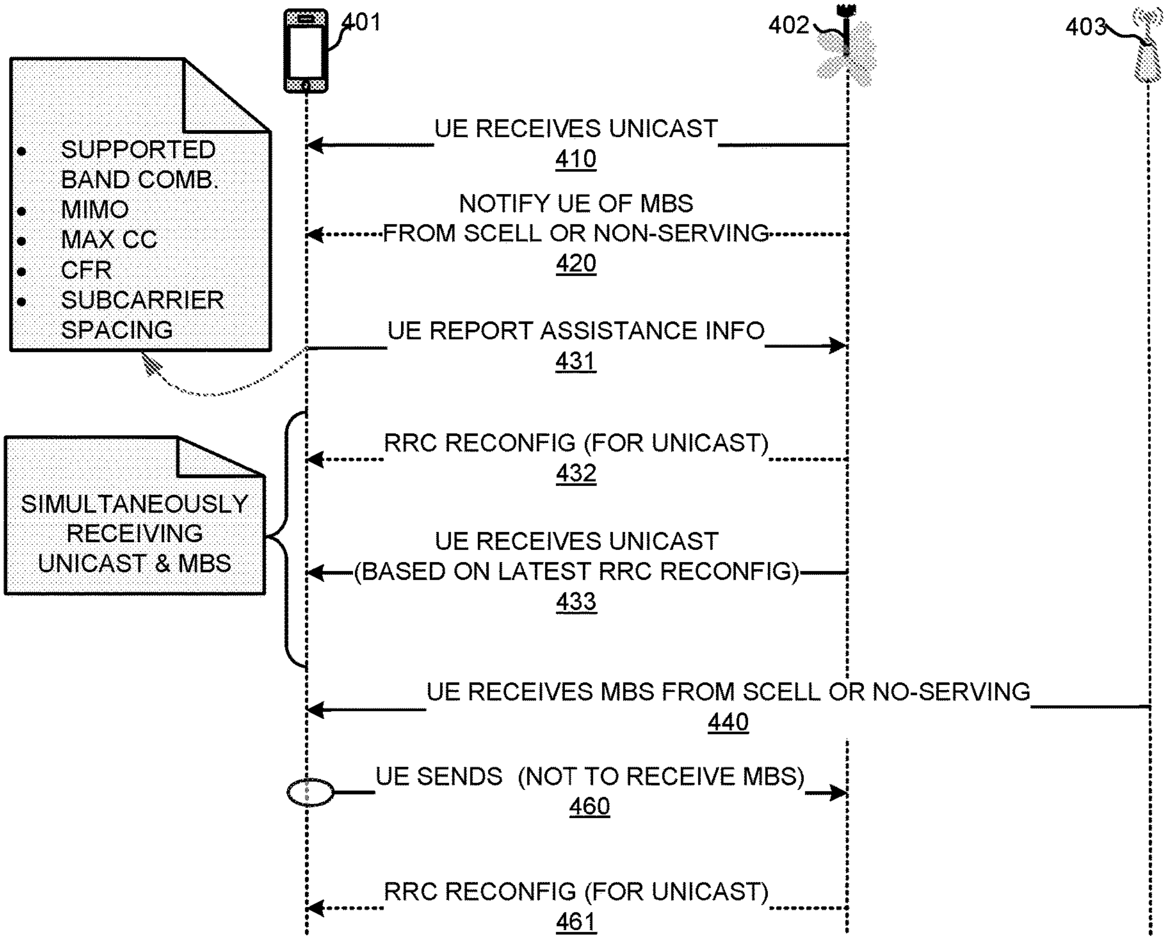
FIG. 4 illustrates an exemplary flow diagram of information exchange among the UE, the PCell, and the SCell/non-serving cell for the UE to receive MBS in accordance with embodiments of the current invention.

FIG. 4 illustrates an exemplary flow diagram of information exchange among the UE, the PCell, and the SCell/non-serving cell for the UE to receive MBS in accordance with embodiments of the current invention. UE 401, at step 410, receives unicast service in RRC CONNECTED state from serving PCell gNB 402. In one embodiment, at step 420, UE receives a notification/signalling from serving PCell gNB 402 about MBS provided through non-serving cell or SCell, such as gNB 403. In one embodiment, at step 431, UE 401 interested in the MBS provided by gNB 403, sends assistance information to serving PCell gNB 402. In one embodiment, UE 401 reports the MBS assistance information triggered by the notification at step 420. In another embodiment, UE 401 sends the assistance information without the notification. UE 401 reports the corresponding assistance information related multicast broadcast reception via RRC message, e.g., MII, before the UE receives multicast broadcast on SCell or non-serving cell. The purpose of the assistance information is to make the network further (re) configure the unicast service parameters from the PCell based on UE processing capability for the corresponding service reception. For example, the maximum data rate supporting by UE is unchanged after UE receive the multicast broadcast on SCell or non-serving cell. If UE dose not report the corresponding information related to the multicast broadcast reception, the gNB will continue using full data rate to schedule the unicast service from PCell, which means that the UE will not have enough resources to receive the multicast broadcast on SCell or non-serving cell. Besides, in this disclosure, the UE also can send some information, e.g., RRC information, to notify the network that it will not receive the multicast broadcast on non-serving cell or SCell due to some reasons, e.g., the UE is not interest in the current multicast broadcast service. After the network receive the corresponding information, the network also can (re)configure the unicast reception with full data rate or capability, e.g., the network can active the CC used for multicast broadcast reception to receive the unicast service.

Upon receiving the assistance information, at step 432, the serving PCell gNB 402 reconfigures the unicast reception on PCell via RRC Reconfiguration message. In one embodiment, the network, through serving PCell gNB 402, deactivates/releases one or more CCs and configures the released one or more CCs for the MBS. The network adjusts the TB size of the unicast service based on the remaining maximum data rate for the UE receiving unicast service. At step 433, UE 401 receives unicast data based on the latest RRC Reconfiguration to be able to receive the MBS simultaneously. At step 440, UE 401 receives MBS from non-serving cell or SCell gNB 403.

In one embodiment, the UE may terminate the reception of the MBS. At step 460, UE 401 sends an indication to the serving PCell gNB 402 indicating to terminate/be not interest in the MBS from the non-serving cell or SCell. At step 461, the network, via serving PCell gNB 402, reconfigures the unicast reception with increased/full data rate or capability. The network activates the CC used for multicast broadcast reception to receive the unicast service.

Figure 5:
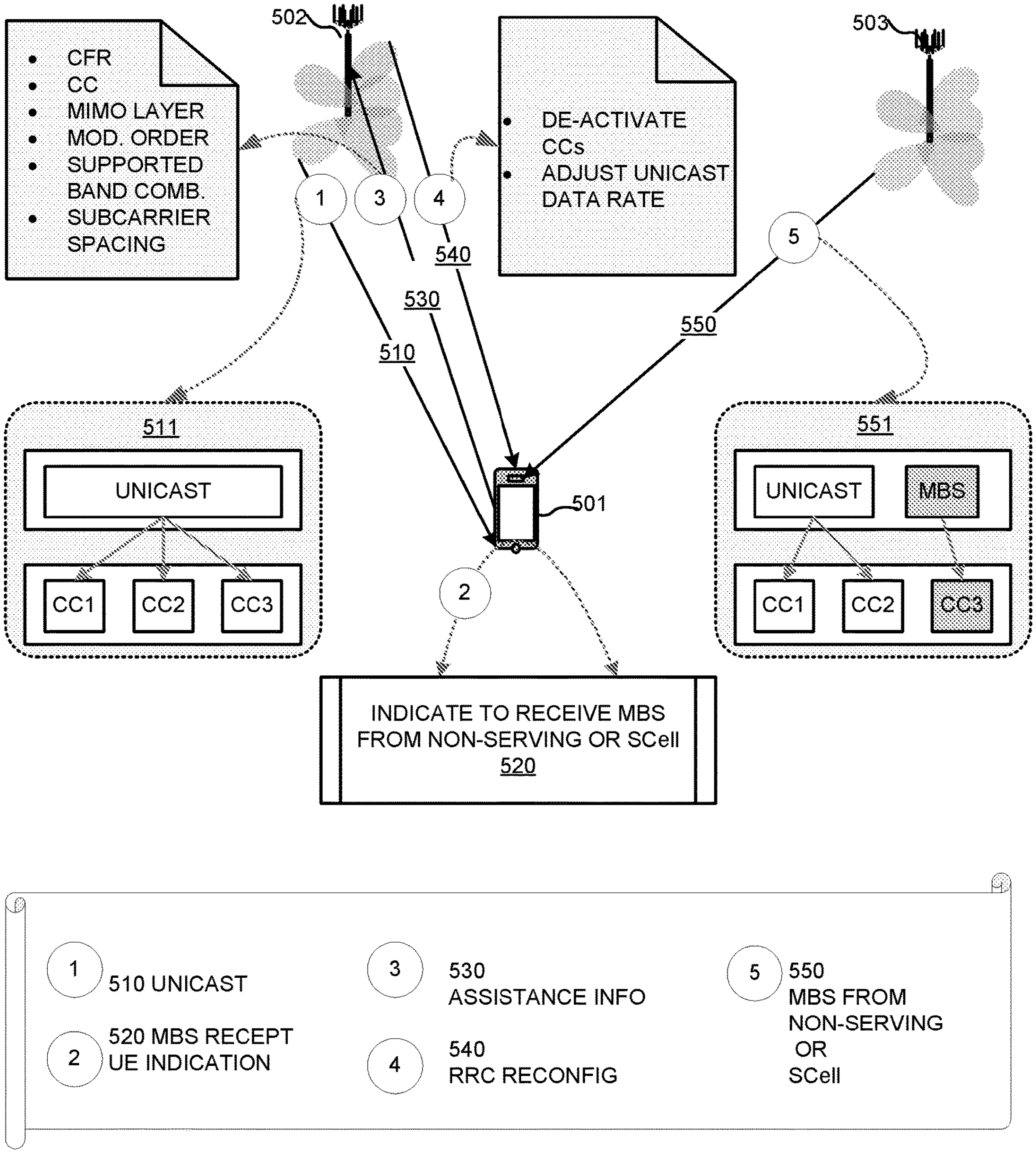
FIG. 5 illustrates exemplary diagrams of the UE receiving MBS from a non-serving cell delivered by different operators in accordance with embodiments of the current inventions.

FIG. 5 illustrates exemplary diagrams of the UE receiving MBS from a non-serving cell delivered by different operators in accordance with embodiments of the current inventions. At step 510, UE 501 receives unicast from serving PCell 502 with CC configuration 511. UE 501 is configured with multiple CCs for the unicast. Non-serving cell gNB 503 provides MBS, which UE 501 is interested in.

At step 520, UE 501 indicates its interest to receive MBS from non-serving cell/SCell gNB 503. At step 530, the UE reports corresponding assistance information relating to the MBS reception. In one embodiment, assistance information is transmitted with RRC message, such as MII. The assistance information includes one or more of: CFR, number of CC, MIMO layer configuration, modulation order, supported band combinations and subcarrier spacing. For example, the UE reports the following information: it can receive the multicast broadcast service on non-serving cell and SCell, it uses one CC and corresponding band combination and CFR information to receive the multicast broadcast service, the modulation order and MIMO layer used for the multicast broadcast reception are QPSK, two layers, respectively. When the network, gNB 502, receives the assistance information from UE 501, configuration for the existing unicast service reception is updated/reconfigured. In one embodiment, at step 540, the NW deactivates/releases some component carrier(s) used for multicast broadcast reception. The NW adjusts the TB size of the unicast service based on the remaining maximum data rate for the UE receiving unicast service. UE 501 receives the unicast service based on the latest reconfiguration message received from the serving PCell, gNB 502. At step 550, UE 501 simultaneously receives the MBS on SCell/non-serving cell, from gNB 503, with the reserved resource/capability. UE 501 reconfigures from CC configuration 511 to CC configuration 551 for receiving the unicast and MBS simultaneously. As an example, CC configuration 551 reconfigures CC3 to be used for the MBS, while CC1 and CC2 are used for the unicast service.

Figure 6A:
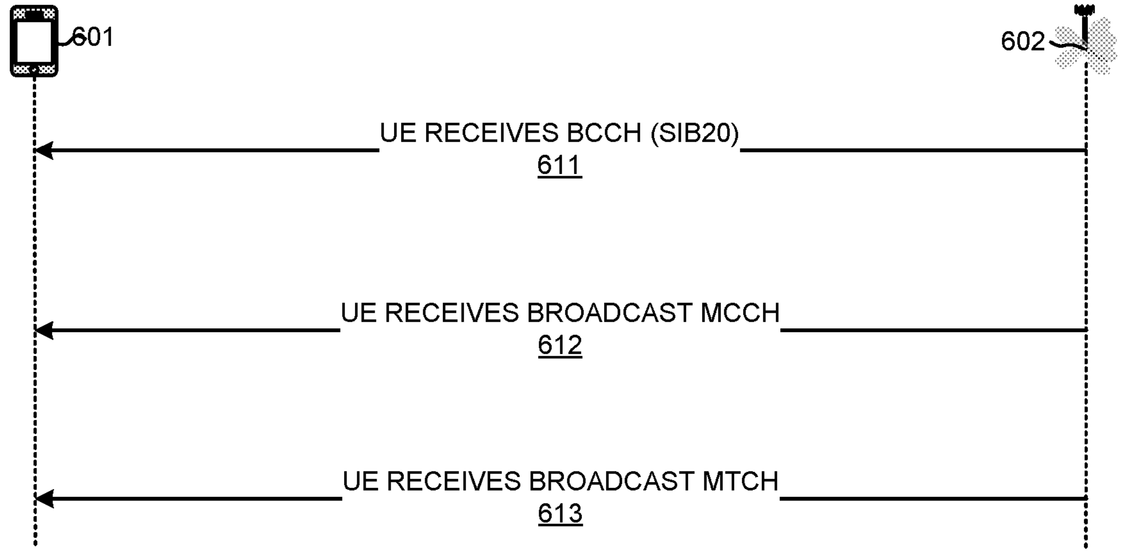
FIG. 6A illustrates an exemplary message diagram of the UE receiving the MBS broadcast BCCH, MCCH and MTCH on the serving cell for broadcast reception in accordance with embodiments of the current invention.

FIG. 6A illustrates an exemplary message diagram of the UE receiving the MBS broadcast BCCH, MCCH and MTCH on the serving cell for broadcast reception in accordance with embodiments of the current invention. UE 601 establishes a connection with serving PCell gNB 602. In one embodiment, two-step procedure is used for MBS, which includes broadcast control channel (BCCH) with MBS specific SIB20, and MCCH carries transmission configuration of one or more MTCHs. UE 601 is to receive MBS delivered by gNB 602. At step 611, UE 601 receives BCCH from gNB 602. BCCH carries MBS specific SIB20, which indicates where and how the UE receives the MCCH. The SIB20 includes MBS related information such as the CFR for MCCH/MTCH, MCCH modification period, MCCH repetition period, MCCH window, and/or other MBS related information. Based on the SIB20 information, at step 612, the UE receives corresponding MCCH information from gNB 602. MCCH includes the MTCH reception parameters, such as the G-RNTI for the broadcast, the mapping relationship between the G-RNTI and broadcast service session, and the DRX configuration for broadcast. MCCH information is transmitted to the UE to provide the transmission configuration of the MTCH. At step 613, UE 601 receives MBS on the MTCH from gNB 602 accordingly.

Figure 6B:
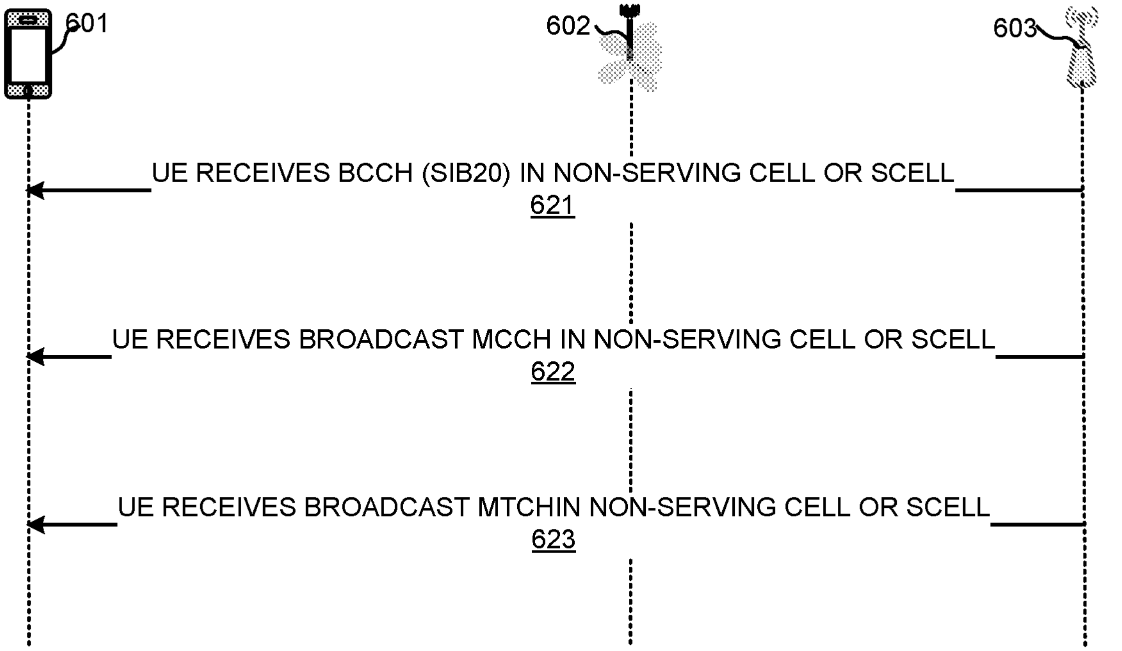
FIG. 6B illustrates an exemplary message diagram of the UE receiving the MBS broadcast BCCH, MCCH and MTCH on the SCell or non-serving cell for broadcast reception in accordance with embodiments of the current invention.

FIG. 6B illustrates an exemplary message diagram of the UE receiving the MBS broadcast BCCH, MCCH and MTCH on the SCell or non-serving cell for broadcast reception in accordance with embodiments of the current invention. In one novel aspect, UE performs the two-step procedure to receive MBS from non-serving cell or SCell. In one embodiment, the UE receives the BCCH, MCCH and corresponding MTCH in SCell or non-serving cell directly, which is similar with the behavior that the UE receive the BCCH, MCCH and MTCH in PCell. UE 601 establishes a connection with serving cell gNB 602 and is interested in receiving MBS from non-serving cell or SCell of gNB 603. At step 621, UE 601 receives the BCCH with system information directly in non-serving cell or SCell from gNB 603. In one embodiment, BCCH from gNB 603 uses system information RNTI (SI-RNTI) scrambling, which carries MBS specific SIB20. SIB20 indicates where and how the UE receives the MCCH in non-serving cell or SCell. The SIB20 indicates the CFR for MCCH/MTCH, MCCH modification period, MCCH repetition period, MCCH window and so on. Based on one or more of these parameters, at step 622, UE 601 receives the corresponding MCCH information from gNB 603 in non-serving cell or SCell. The MCCH contains the MTCH reception parameter, e.g., the G-RNTI for the broadcast MTCH reception, the mapping relationship between the G-RNTI and broadcast service session, the DRX configuration for broadcast and so on. At step 623, UE 601 receives the broadcast traffic packet carried by MTCH in non-serving cell or SCell.

Figure 6C:
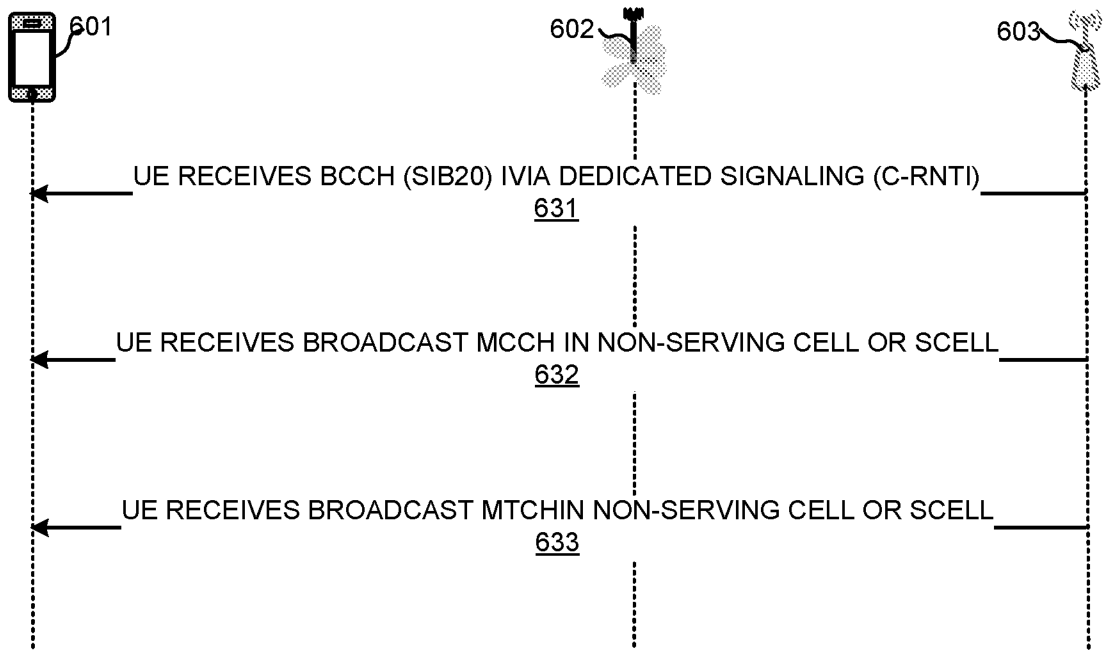
FIG. 6C illustrates an exemplary message diagram of the UE receiving the MBS broadcast BCCH via dedicated signaling and corresponding MCCH and MTCH on SCell or non-serving cell for broadcast reception in accordance with embodiments of the current invention.

FIG. 6C illustrates an exemplary message diagram of the UE receiving the MBS broadcast BCCH via a dedicated signaling and corresponding MCCH and MTCH on SCell or non-serving cell for broadcast reception in accordance with embodiments of the current invention. In one embodiment, the UE receives the BCCH with UE dedicated signaling in non-serving cell or SCell directly, corresponding MCCH and MTCH in SCell or non-serving cell. UE 601 establishes a connection with serving cell gNB 602 and is interested in receiving MBS from non-serving cell or SCell of gNB 603. At step 631, UE 601 receives the BCCH with dedicated signaling from gNB 603 in non-serving cell or SCell. In one embodiment, BCCH from gNB 603 uses cell RNTI (C-RNTI) scrambling, which carries MBS specific SIB20. SIB20 indicates where and how the UE receives the MCCH in non-serving cell or SCell. The SIB20 indicates the CFR for MCCH/MTCH, MCCH modification period, MCCH repetition period, MCCH window and so on. Based on one or more of these parameters, at step 632, UE 601 receives the corresponding MCCH information from gNB 603 in non-serving cell or SCell. The MCCH contains the MTCH reception parameters, e.g., the G-RNTI for the broadcast MTCH reception, the mapping relationship between the G-RNTI and broadcast service session, the DRX configuration for broadcast and so on. At step 633, UE 601 receives the broadcast traffic packet carried by MTCH in non-serving cell or SCell.

Figure 6D:
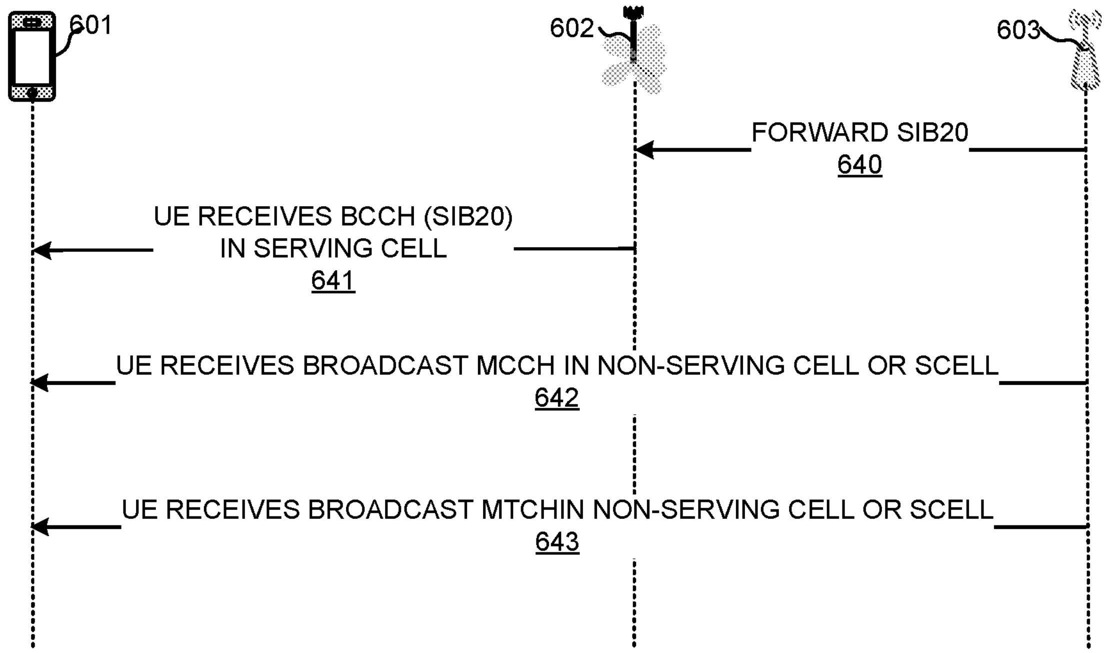
FIG. 6D illustrates an exemplary message diagram of the UE receiving the MBS broadcast BCCH on the PCell and corresponding MCCH and MTCH on SCell or non-serving cell for broadcast reception in accordance with embodiments of the current invention.

FIG. 6D illustrates an exemplary message diagram of the UE receiving the MBS broadcast BCCH on the PCell and corresponding MCCH and MTCH on SCell or non-serving cell for broadcast reception in accordance with embodiments of the current invention. In one embodiment, the UE receives the MBS broadcast BCCH in PCell, corresponding MCCH and MTCH in SCell or non-serving cell. At step 640, before the UE receives the MBS broadcast BCCH in PCell, gNB 603 from the non-serving cell or SCell forwards the MBS broadcast SIB information, which is the MBS specific SIB20, to gNB 602 from the PCell. At step 641, UE 601 receives BCCH with dedicated signaling with C-RNTI scrambling, or with system information with SI-RNTI scrambling. The BCCH carries MBS specific SIB20, the MBS specific SIB will indicate where and how the UE receives the MCCH in non-serving cell or SCell. At step 642, UE 601 receives MCCH from gNB 603 from the non-serving cell or SCell. The MCCH contains the MTCH reception parameters as described above. At step 643, the UE receives MBS on MTCH from gNB 603 from the non-serving cell or the SCell.

Figure 6E:
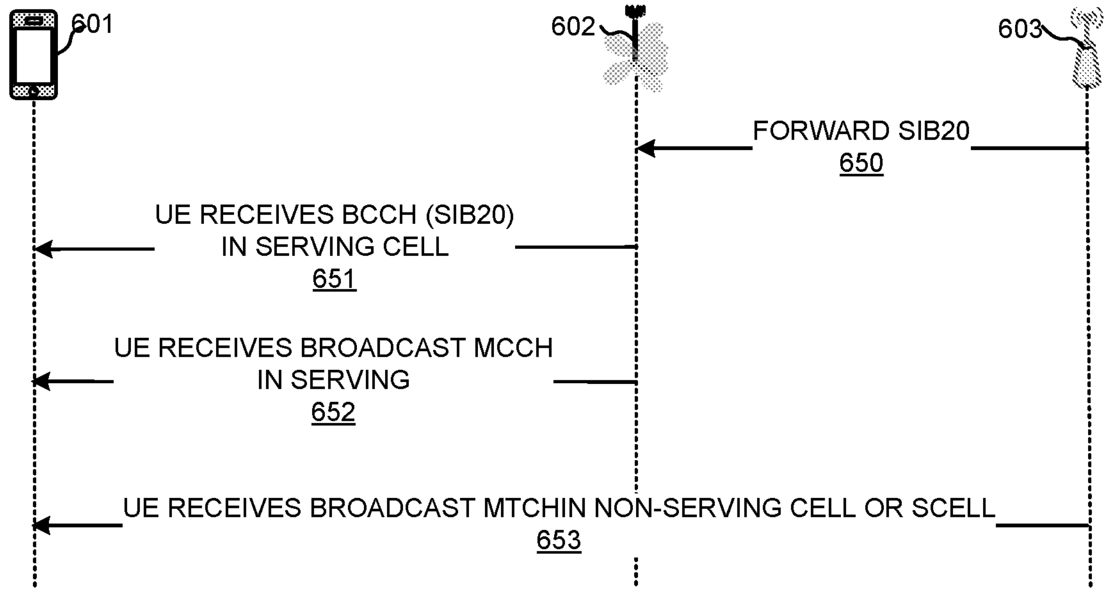
FIG. 6E illustrates an exemplary message diagram of the UE receiving the MBS broadcast BCCH and MCCH on the PCell and corresponding MTCH on SCell or non-serving cell for broadcast reception in accordance with embodiments of the current invention.

FIG. 6E illustrates an exemplary message diagram of the UE receiving the MBS broadcast BCCH and MCCH on the PCell and corresponding MTCH on SCell or non-serving cell for broadcast reception in accordance with embodiments of the current invention. In one embodiment, the UE receives the MBS broadcast BCCH and MCCH in PCell, and corresponding MTCH in SCell or non-serving cell. At step 650, before the UE receives the MBS broadcast BCCH in PCell, gNB 603 from the non-serving cell or SCell forwards the MBS broadcast SIB information, which is the MBS specific SIB20, to gNB 602 from the PCell. At step 651, UE 601 receives BCCH with dedicated signaling with C-RNTI scrambling, or by SI-RNTI scrambling. The BCCH carries MBS specific SIB20, the MBS specific SIB will indicate where and how the UE receives the MCCH in non-serving cell or SCell. At step 652, UE 601 receives MCCH from gNB 602 from the serving PCell. The MCCH contains the MTCH reception parameters as described above. At step 653, the UE receives MBS on MTCH from gNB 603 from the non-serving cell or the SCell.

Figure 7:
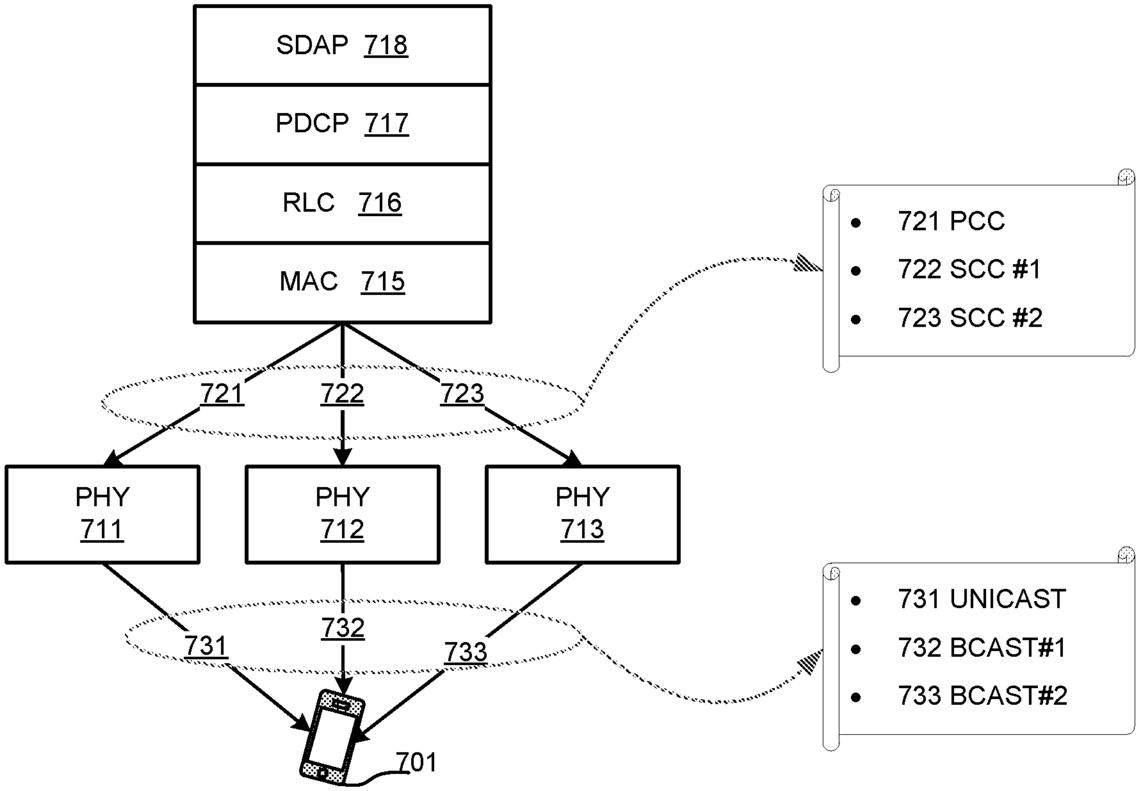
FIG. 7 illustrates an exemplary diagram of the procedure that the UE receive the MBS broadcast SIB via dedicated signaling with cell information indication binding to component carrier in accordance with embodiments of the current invention.

FIG. 7 illustrates an exemplary diagram of the procedure that the UE receive the MBS broadcast SIB via dedicated signaling with cell information indication binding to component carrier in accordance with embodiments of the current invention. In one embodiment, the dedicated signaling to deliver the MBS specific information, e.g., MBS broadcast SIB20, shall contain the carrier specific information. The carrier specific information, such as the Cell ID, differentiates/identifies a component carrier for the information. As an example, UE 701 is configured with three CCs, including primary CC (PCC) 721, and secondary CCs (SCCs) of SCC 722 and SCC 723. Three PHY entities 711, 712, and 713 are configured for each CC 721, 722, and 723, respectively. PHY entities 711, 712, and 713 are configured with protocol entities of MAC 715, RLC 715, PDCP 717, and SDAP 718. Multicast broadcast service and unicast service are transmitted to PHY entities 711, 712, and 713, respectively through protocol entities of MAC 715, RLC 715, PDCP 717, and SDAP 718. The three CCs are configured to receive the corresponding services. In one example, PCC 721 is configured for unicast service 731, SCC 722 and SCC 723 are configured for broadcast service #1 732 and broadcast #2 733, respectively. If the MBS broadcast SIB20 is delivered by the UE dedicated signaling, e.g., based on C-RNTI scrambling, the UE will not differentiate the dedicated SIB20 signaling corresponds to which component carrier(s), e.g., SCC #1 732 or SCC #2 733, unless the corresponding carrier information is also contained, e.g., the Cell ID.

Figure 8:
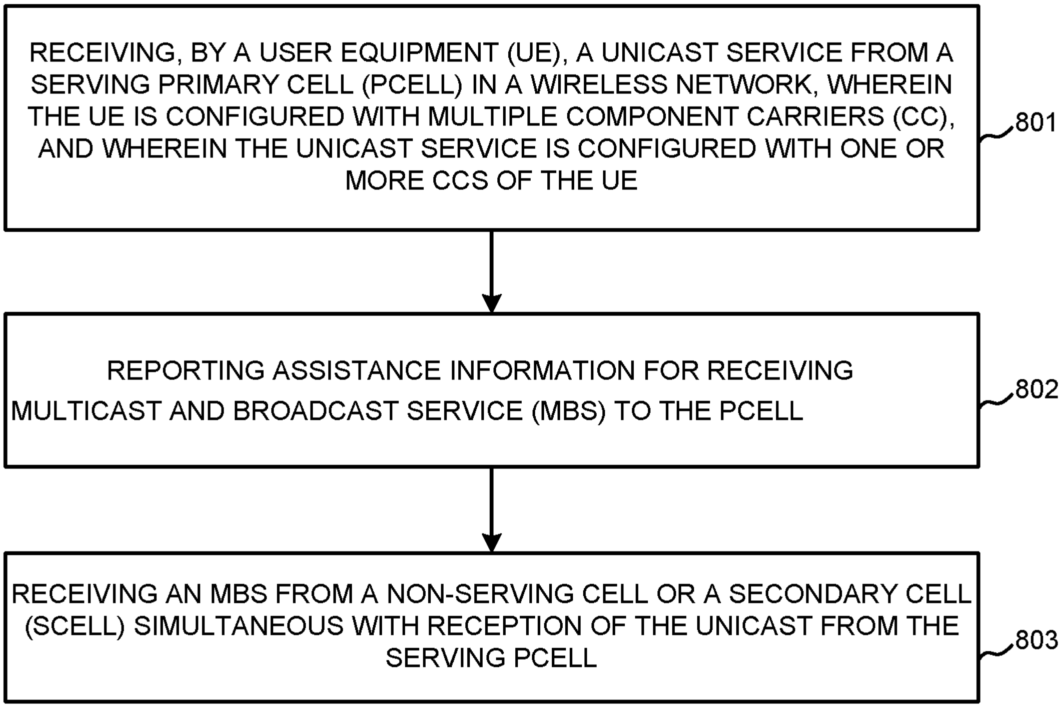
FIG. 8 illustrates an exemplary flow chart for the UE to receive MBS from the non-serving cell or SCell in accordance with embodiments of the current invention.

FIG. 8 illustrates an exemplary flow chart for the UE to receive MBS from the non-serving cell or SCell in accordance with embodiments of the current invention. At step 801, the UE receives a unicast service from a serving primary cell (PCell) in a wireless network, wherein the UE is configured with multiple component carriers (CC), and wherein the unicast service is configured with one or more CCs of the UE. At step 802, the UE reports assistance information for receiving multicast and broadcast service (MBS) to the PCell. At step 803, the UE receives an MBS from a non-serving cell or a secondary cell (SCell) simultaneous with reception of the unicast from the serving PCell.

Figure 9:
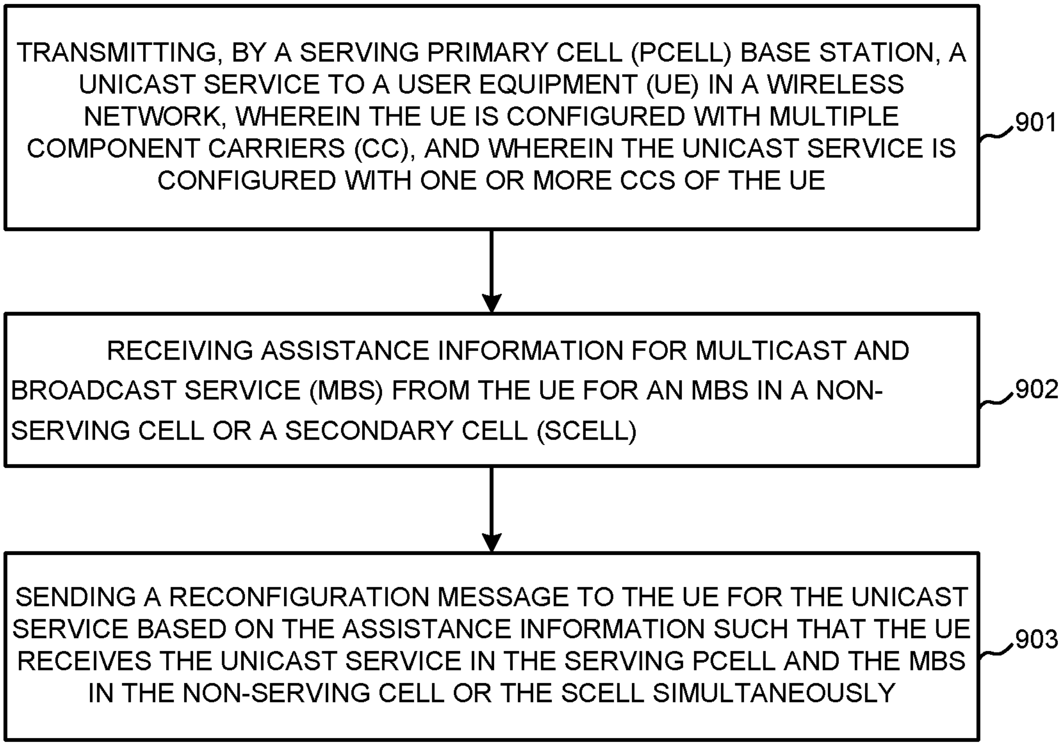
FIG. 9 illustrates an exemplary flow chart for the base station transmitting unicast to the UE and configures UE for the MBS from non-serving cell or SCell in accordance with embodiments of the current invention.

FIG. 9 illustrates an exemplary flow chart for the base station transmitting unicast to the UE and configures UE for the MBS from non-serving cell or SCell in accordance with embodiments of the current invention. At step 901, the base station transmits a unicast service to a user equipment (UE) in a wireless network, wherein the UE is configured with multiple component carriers (CC), and wherein the unicast service is configured with one or more CCs of the UE. At step 902, the base station receives assistance information for multicast and broadcast service (MBS) from the UE for an MBS in a non-serving cell or a secondary cell (SCell). At step 903, the base station sends a reconfiguration message to the UE for the unicast service based on the assistance information such that the UE receives the unicast service in the serving PCell and the MBS in the non-serving cell or the SCell simultaneously.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

receiving, by a user equipment (UE), a unicast service from a serving primary cell (PCell) in a wireless network, wherein the UE is configured with multiple component carriers (CC), and wherein the unicast service is configured with one or more CCs of the UE;

reporting assistance information for receiving multicast and broadcast service (MBS) to the serving PCell;

receiving an MBS from a non-serving cell or a secondary cell (SCell) simultaneously with reception of the unicast service from the serving PCell; and receiving an adjustment configuration for the unicast service from the serving PCell, wherein the adjustment configuration is based on the assistance information and available data rate for UE to reduce a unicast data rate by deactivating one or more CCs for the unicast service.

2. The method of claim 1, wherein the assistance information for MBS includes one or more elements for the MBS reception comprising supported band combination, common frequency resource (CFR) configuration, a number of component carrier, multiple input multiple output (MIMO) layer, modulation order and subcarrier spacing.

3. The method of claim 1, further comprising reporting a UE capability to the serving PCell indicating whether the UE can receive MBS from a non-serving cell or a SCell.

4. The method of claim 1, wherein the reporting assistance information is triggered by an MBS available indication from the serving PCell.

5. The method of claim 1, wherein the reporting assistance information is initiated by the UE with interest in the MBS.

6. The method of claim 1, wherein the UE receives MBS control channel (MCCH) and MBS traffic channel (MTCH) in the non-serving cell or the SCell.

7. The method of claim 6, wherein the UE receives broadcast control channel (BCCH) with a system information or a dedicated signaling in the non-serving cell or the SCell, wherein the system information is scrambled with a system information RNTI (SI-RNTI), and the dedicated signaling is scrambled with a cell radio network temporary identifier (C-RNTI).

8. The method of claim 6, wherein the UE receives BCCH with a system information or a dedicated signaling in the serving PCell, wherein the system information is scrambled with a system information RNTI (SI-RNTI), and the dedicated signaling is scrambled with a cell radio network temporary identifier (C-RNTI).

9. The method of claim 1, wherein the UE receives MTCH in the non-serving cell or the SCell, and receives MCCH in the serving PCell, and receives BCCH in the serving PCell.

10. A method comprising:

transmitting, by a serving primary cell (PCell) of a base station, a unicast service to a user equipment (UE) in a wireless network, wherein the UE is configured with multiple component carriers (CC), and wherein the unicast service is configured with one or more CCs of the UE;

receiving assistance information for multicast and broadcast service (MBS) from the UE for an MBS in a non-serving cell or a secondary cell (SCell);

sending a reconfiguration message to the UE for the unicast service based on the assistance information and available data rate for UE to reduce a unicast data rate such that the UE receives the unicast service in the serving PCell and the MBS in the non-serving cell or the SCell simultaneously; and sending an adjustment configuration for the unicast service to deactivate one or more CCs for the unicast service.

11. The method of claim 10, wherein the assistance information for MBS includes one or more elements for the MBS reception comprising supported band combination, common frequency resource (CFR) configuration, a number of component carrier, multiple input multiple output (MIMO) layer, modulation order, and subcarrier spacing.

12. The method of claim 10, further comprising sending an MBS available indication to the UE.

13. The method of claim 10, further comprising transmitting broadcast control channel (BCCH) with a system information or a dedicated signaling to the UE for the MBS, wherein the system information is scrambled with a system information RNTI (SI-RNTI), and the dedicated signaling is scrambled with a cell radio network temporary identifier (C-RNTI).

14. The method of claim 13, wherein the serving PCell of the base station further transmitting MBS control channel (MCCH) to the UE for the MBS.

15. A user equipment (UE), comprising:

a transceiver that transmits and receives radio frequency (RF) signal in a wireless network;

a unicast module that receives a unicast service from a serving primary cell (PCell) in the wireless network, wherein the UE is configured with multiple component carriers (CC), and wherein the unicast service is configured with one or more CCs of the UE, and receives adjustment configuration for the unicast serving from the serving PCell, and wherein the adjustment configuration deactivates one or more CCs for the unicast service;

a reporting module that reports assistance information for receiving multicast and broadcast service (MBS) to the serving PCell; and an MBS module that receives an MBS from a non-serving cell or a secondary cell (SCell) simultaneously with reception of the unicast service from the serving PCell, and receives an adjustment configuration for the unicast service from the serving PCell, wherein the adjustment configuration is based on the assistance information and available data rate for UE to reduce a unicast data rate by deactivating one or more CCs for the unicast service.

16. The UE of claim 15, wherein the assistance information for MBS includes one or more elements for the MBS reception comprising supported band combination, common frequency resource (CFR) configuration, the number of component carrier, multiple input multiple output (MIMO) layer, modulation order and subcarrier spacing.

17. The UE of claim 15, wherein the MBS module further receives MBS control channel (MCCH) and MBS traffic channel (MTCH) in the non-serving cell or the SCell.

18. The UE of claim 17, wherein the MBS module receives broadcast control channel (BCCH) with a system information or a dedicated signaling in the non-serving cell or the SCell, wherein the system information is scrambled with a system information RNTI (SI-RNTI), and the dedicated signaling is scrambled with a cell radio network temporary identifier (C-RNTI).

19. The UE of claim 17, wherein the UE receives BCCH with a system information or a dedicated signaling in the serving PCell, wherein the system information is scrambled with a system information RNTI (SI-RNTI), and the dedicated signaling is scrambled with a cell radio network temporary identifier (C-RNTI).

20. The UE of claim 15, wherein the MBS module further receives MTCH in the non-serving cell or the SCell, and receives MCCH in the serving PCell, and receives BCCH in the serving PCell.

* * * * *